(12) United States Patent
Oks et al.

(10) Patent No.: US 9,398,315 B2
(45) Date of Patent: Jul. 19, 2016

(54) MULTI-SOURCE VIDEO CLIP ONLINE ASSEMBLY

(75) Inventors: Eduard Oks, Bat-Yam (IL); Georgy A. Kolotov, Raanana (IL)

(73) Assignee: Samsung Electronics Co., Ltd., Suwon-si (KR)

( * ) Notice: Subject to any disclaimer, the term of this patent is extended or adjusted under 35 U.S.C. 154(b) by 1622 days.

(21) Appl. No.: 12/882,241

(22) Filed: Sep. 15, 2010

(65) Prior Publication Data

US 2012/0066598 A1 Mar. 15, 2012

(51) Int. Cl.
*H04N 21/218* (2011.01)
*H04N 21/2187* (2011.01)
*H04N 21/80* (2011.01)
*G11B 27/034* (2006.01)

(52) U.S. Cl.
CPC ........ *H04N 21/21805* (2013.01); *G11B 27/034* (2013.01); *H04N 21/2187* (2013.01); *H04N 21/80* (2013.01)

(58) Field of Classification Search
CPC .................... H04N 21/21805; H04N 21/2187; H04N 21/80; G11B 27/034
See application file for complete search history.

(56) References Cited

U.S. PATENT DOCUMENTS

| | | | | |
|---|---|---|---|---|
| 5,850,352 | A * | 12/1998 | Moezzi et al. | 345/419 |
| 6,778,557 | B1 * | 8/2004 | Yuki et al. | 370/468 |
| 7,466,349 | B2 | 12/2008 | Iijima | |
| 7,671,893 | B2 * | 3/2010 | Li et al. | 348/211.3 |
| 2002/0041628 | A1 * | 4/2002 | Andersson et al. | 375/240.12 |
| 2005/0166243 | A1 * | 7/2005 | Chiu et al. | 725/93 |
| 2005/0193421 | A1 * | 9/2005 | Cragun | 725/80 |
| 2006/0023073 | A1 * | 2/2006 | Li | H04N 7/17318 348/211.99 |
| 2006/0028583 | A1 * | 2/2006 | Lin et al. | 348/584 |
| 2006/0056056 | A1 * | 3/2006 | Ahiska et al. | 359/690 |
| 2006/0104347 | A1 * | 5/2006 | Callan | H04N 7/15 375/240.01 |
| 2007/0147827 | A1 * | 6/2007 | Sheynman et al. | 396/325 |
| 2009/0163185 | A1 * | 6/2009 | Lim et al. | 455/414.1 |
| 2009/0193469 | A1 * | 7/2009 | Igarashi | 725/56 |
| 2010/0128779 | A1 * | 5/2010 | Chatterjee et al. | 375/240.12 |
| 2010/0306335 | A1 * | 12/2010 | Rios et al. | 709/211 |
| 2011/0103770 | A1 * | 5/2011 | Goodman et al. | 386/255 |
| 2011/0242413 | A1 * | 10/2011 | Azzopardi | H04N 5/247 348/512 |

FOREIGN PATENT DOCUMENTS

KR 10-2008-0091952 A 10/2008

* cited by examiner

*Primary Examiner* — Randy Flynn
(74) *Attorney, Agent, or Firm* — Jefferson IP Law, LLP

(57) ABSTRACT

A method for creating a cooperative movie sequence comprises connecting two or more mobile devices over a network, designating one of said mobile devices as a Master device and the remaining devices as Slave devices, capturing movie sequences in said Master device and at least in one of said Slave devices, and integrating on-the-fly movie streams and/or images transmitted over said network by said one or more Slave devices into the movie sequence being captured by said Master device.

11 Claims, 3 Drawing Sheets

MULTI-SOURCE VIDEO CLIP ONLINE ASSEMBLY

FIELD OF THE INVENTION

The present invention relates to the handling of streaming video. More particularly, the invention relates to the assembly of streaming video coming from different sources into a single video clip.

BACKGROUND OF THE INVENTION

Acquiring video clips using mobile devices has become common since most mobile devices, such as PDEs and cellular phones possess video recording capabilities. Some mobile devices are also provided with some editing options, which enable the user to perform simple operations on the video clip he has recorded in his device.

Efficient communication channels and improved processing ability also make it possible for users of mobile devices to act cooperatively, for instance by sharing music or games in real-time, and it would be desirable to allow users to create movie clips by cooperatively acquiring a scene from different locations and assembling different video clips into a single, combined clip. Currently, however, there is no solution in the art that enables the online assembly of video clip from video streaming received from several mobile devices. Therefore, any assembly or editing of video clips is done offline and, of course, no live preview of the resulting assembled clip is therefore available.

SUMMARY OF THE INVENTION

The invention relates to a method for creating a cooperative movie sequence, comprising connecting two or more mobile devices over a network, designating one of said mobile devices as a Master device and the remaining devices as Slave devices, capturing movie sequences in said Master device and at least in one of said Slave devices, and integrating on-the-fly movie streams and/or images transmitted over said network by said one or more Slave devices into the movie sequence being captured by said Master device. While any suitable type of network can be employed, typical embodiments of the invention employ a network selected from WiFi and Bluetooth.

In one embodiment of the invention the movie stream arriving into the Master device from a Slave device is integrated into the Master stream by ignoring the blocks of the Slave movie and using the I- and P-frame counters of the Master movie, thus converting each frame of the Slave movie into its difference from the last I-frame of the Master movie.

In another embodiment of the invention the movie stream arriving into the Master device from a Slave device is integrated into the Master stream by waiting for the next start of a block in the Master stream, and replacing it with the Slave stream.

In still another embodiment of the invention the movie stream arriving into the Master device from a Slave device is integrated into the Master stream by replacing the frames from the Master stream with those in the Slave stream directly, and forcing the first stream of the result to be an I-frame.

As will be apparent to a skilled person, more than one Slave device can transmit movie data to the Master device, in which case transmitting is rationed such that no single Slave device is allowed to send movies that are too long and occupy the final stream completely.

In another embodiment of the invention more than one Slave device transmits movie data to the Master device, wherein transmitting is synchronized to avoid avoiding collisions between different Slave data streams by either blocking on the first-come-first-served basis, or by allowing the users, particularly the user of the Master device, to make relevant decisions on which stream is to be given priority.

The user of the Master device can be notified that additional data has arrived, and options can be provided to allow said user to decide whether or not to merge it.

The timing of the transmission of the Slave movie can vary. According to one embodiment of the invention the Slave movie is sent to the Master device when the user stops recording. According to another embodiment of the invention the Slave movie is sent to the Master device when a desired length of time has elapsed. An illustrative length of time is, e.g., up to 5 seconds.

The invention also encompasses an ad hoc network for creating a cooperative movie sequence, comprising two or more mobile devices connected over said network, wherein one of said mobile devices is designated as a Master device and the remaining devices are designated as Slave devices, wherein each of said Master and Slave devices are suitable to capture movie sequences and/or images, and wherein said Slave devices are programmed to transmit movie and/or image data to said Master device, and said Master device is programmed to receive movie and/or image data from said one or more Slave devices and to integrate them on-the-fly into the movie sequence being captured by it.

DETAILED DESCRIPTION OF THE INVENTION

The invention allows multiple users to participate in the creation of a single movie, by recording it from several distinct vantage points and combining the results in real-time, thus removing the need for post-production. By so doing the user experience is enhanced by removing the need for the later editing on a PC, with the result that once the users stop recording, the movie has already been created.

1. Process

The invention will now be described with reference to the various process steps. The first step is to connect two or more devices into a network. This can be done through WIFI, BT or any other known communication pattern, in a manner currently known in the art.

According to an embodiment of the invention a first device is designated as "Master" and the rest are designated as "Slaves". The Master device is the one on which the main movie stream is recorded, and the one on which the final resulting movie is created. The Slave devices are the ones that capture and send additional data in the form of images and movies, which are integrated into the final movie.

2. Flow 2.1. Slave Device

The purpose of a Slave device is to capture images and/or record movies, and send them to the Master device, where these are integrated into the flow of the main movie. The capture/record is done in the usual way, currently known in the art, by using a camera services provided in the Slave device. According to an embodiment of the invention the sending is done by sending a file (in case of a single picture) or several files (in case of a movie) from the Slave device to the Master device. Files with standard names are created in a storage medium associated with the relevant Slave device. A listener thread detects the creation of the files in each Slave device and sends them, via the established connection, to the Master device.

2.2. Master Device

The purpose of the Master device is to record the main stream of the movie, to detect the arrival of additional video data from the Slave devices and to integrate them on-the-fly into the final movie stream.

The capture/record is done in the usual way, in a manner currently known in the art, by using the Camera services provided by the device.

According to an embodiment of the invention the detecting is performed by checking for the creation of the newly arrived data files. Once these are detected, they are merged into the main movie stream, as further detailed hereinafter.

Figure 1:
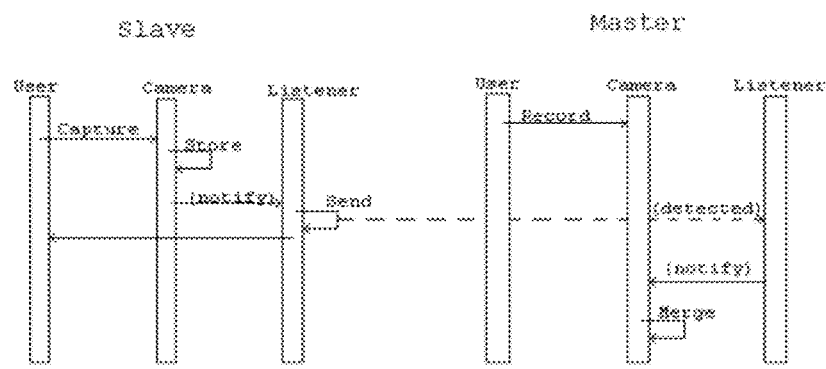
FIG. 1 schematically illustrates the flow of video data between one Slave device in the network and the Master device.

The flow is illustrated in FIG. 1, from which the various events can be appreciated through the relationship of one Slave device with the Master device.

3. Merge 3.1. Single Image

Figure 2:
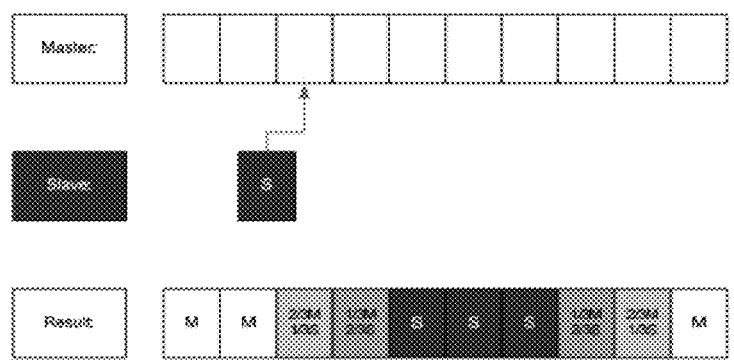
FIG. 2 illustrates the merging of a single image into the Master clip.

When a Slave device sends a single image to the Master device, according to one embodiment of the invention a fade-out/fade-in effect is employed to make the transition look smooth, but of course different merging strategies, known per, can be used. This takes little time, because it is only needed to perform on-the-fly MPEG decoding/encoding of a single stream (main movie). Each "current" frame of the movie is decoded into an image, blended with the Slave image and re-encoded. This process is illustrated in FIG. 2.

3.2. Movie

When a Slave device sends a movie to the Master device, according to one embodiment of the invention no blending is performed. The Slave movie replaces the Master movie. This is because, with existing processing power, decoding/encoding 2 MPEG streams on-the-fly would be prohibitive. However, as more powerful CPUs develop on-the-fly blending may become practically feasible, and any such blending is of course encompassed by the present invention.

Figure 3:
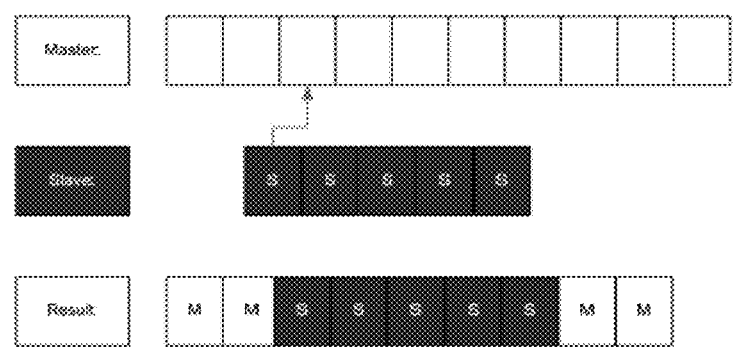
FIG. 3 illustrates the merging of movie data originating from a Slave device into the Master clip.

According to one embodiment of the invention, therefore, the streams are synchronized as detailed hereinafter, and each "current" frame of the Master movie is replaced by the corresponding frame of the Slave movie, as it schematically illustrated in FIG. 3.

3.3. Encoding

The MPEG stream consists, basically, of blocks, each of which starts with one single I-frame and several P-frames. The I-frame is an image that is stored "as-is" in the stream. The P-frames are the differences between the subsequent frames and the last I-frame. The data in these difference images is limited enough to allow for effective encoding.

The Slave movie arrives as a whole, which means that its first frame is an I-frame. The Master stream, however is not guaranteed to have an I-frame as its "current" frame at the same time. Thus, it is important to determine the most effective way of introducing the new block into the current stream. This can be done in 3 distinct ways:

Ignore the blocks of the Slave movie and use the I- and P-frame counters of the Master movie. Each frame of the Slave movie must be converted into its difference from the last I-frame of the Master movie.

Wait for the next start of a block in the Master stream, and replace it with the Slave stream.

Replace the frames from the Master stream with those in the Slave stream directly, and force the current frame of the resulting stream to be an I-frame.

Figure 4:
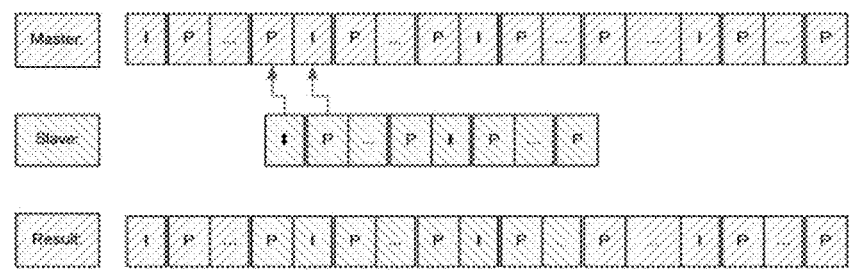
FIG. 4 illustrates the merging of a stream originating from a Slave device into the Master clip with P-frame re-computation.

All options are possible and form parts of the present invention, although the first way is, obviously, the least effective, as it requires much computation: decoding and encoding of the two streams, as schematically illustrated in FIG. 4.

Figure 5:
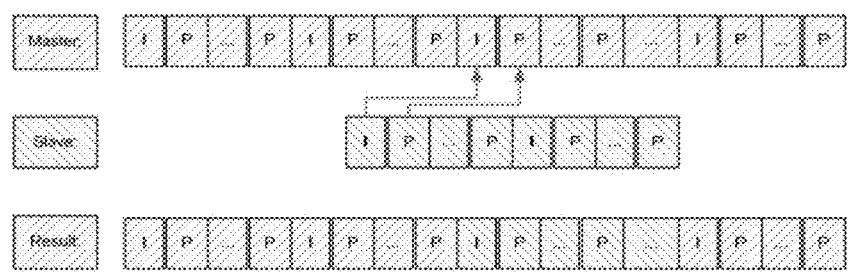
FIG. 5 illustrates the merging of a stream originating from a Slave device into the Master clip with delay.

The second way is more effective and simple to implement, but it means that the resulting movie may have a time back-jump of several frames (up to half a second), which may be noticeable and unpleasant to an eye. This is schematically shown in FIG. 5.

Figure 6:
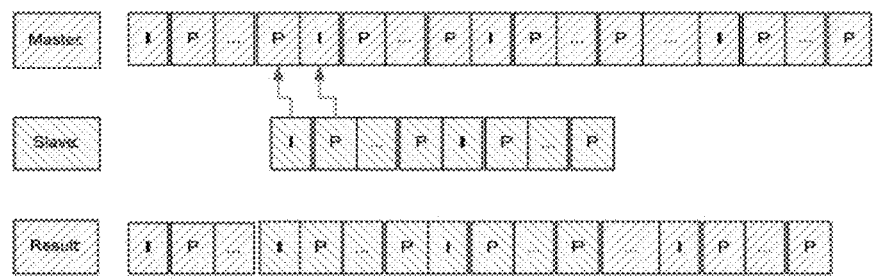
FIG. 6 illustrates the merging of a stream originating from a Slave device into the Master clip with I-frame replacement.

The third way may, in most cases, be the most desirable. This option is schematically illustrated in FIG. 6.

As will be apparent to the skilled person they invention provides a very simple and user-friendly way of creating movie clips cooperatively, without the need for complex control procedures. The Slave device sends the captured image or the recorded movie, and the Master device merges it into its stream. The Slave device does not need to give or be given an indication of whether the data has been sent, has arrived or has been merged. The Master device gives no control to the user over the stream. It simply replaces the frames with those sent to it.

Of course, several operational schemes can be implemented. For instance, more than one Slave device can be used. Accordingly, it is desirable that data from more than one Slave device be integrated into the final movie. This requires strict rationing and synchronization of the streams.

"Rationing" means that no single Slave device is allowed to send movies that are too long and occupy the final stream completely.

"Synchronization" means avoiding collisions between different Slave data streams by either blocking on the first-come-first-served basis, or by allowing the users, particularly the user of the Master device, to make relevant decisions on which stream is to be given priority.

According to another embodiment of the invention the user of the Master device is notified that additional data has arrived, and he is allowed to decide whether or not to merge it. This can be accomplished in many ways that will be apparent to the skilled person, e.g. by keeping the two or more streams (whether the additional streams are actual video streams from the Slave or a fade-in/fade-out of a single image) running for a short period of time, displaying them on the screen side-by-side, and letting the user decide which stream to use for the creation of the final movie.

According to one embodiment of the invention the Slave movie is sent to the Master device when one of the two conditions is fulfilled: either the user stops recording or 5 seconds have elapsed. The reason for keeping the Slave movie streams limited in this embodiment to 5 seconds at most is that the files are sent as complete entities over the connection, and are integrated into the Master stream only upon arrival. According to another embodiment of the invention the data is sent in chunks, thus allowing the Slave streams to be of any length without unduly overloading the network.

All the above description and explanations have been provided for the purpose of illustration and are not intended to limit the invention in any way, except as defined in the appended claims.

The invention claimed is:

1. A method for creating in real-time a single movie, stream, comprising:
   connecting to a data network, a first mobile device being a master device and one or more second mobile devices being slave devices of the master device;
   recording a main movie stream in the master device;
   capturing additional images and movie streams by the slave devices;
   upon detecting capture of the additional images and movie streams on the slave devices, sending the additional images and movie streams to the master device via the data network; and
   upon arrival of the additional images and movie streams from the slave devices, merging, by the master device, the additional images and movie streams into the main movie stream to form a single final movie stream,
   wherein the merging is performed by decoding each current frame of the final main movie stream into images and movie streams, blending the images and movie streams with additional images and movie streams received from a slave device, and encoding the resulting blended images and movie streams as the single final movie stream.

2. A method according to claim 1, wherein the data network is at least one of a WiFi network or a Bluetooth network.

3. A method according to claim 1, wherein an additional movie stream received by the master device from the slave device is merged into the main movie stream by ignoring blocks of the additional movie stream received from the slave device, and using I-frame and P-frame counters of the main movie stream to convert each frame of the additional movie stream received from the slave device into respective P-frames reflecting a difference from the last I-frame of the main movie stream.

4. A method according to claim 1, wherein an additional movie stream received by the master device from the slave device is merged into the main movie stream by waiting for a next start of a block in the main movie stream, and replacing it with the additional movie stream received from the slave device.

5. A method according to claim 1, wherein an additional movie stream received by the master device from the slave device is merged into the main movie stream by replacing frames from the main movie stream with frames in the additional movie stream received from the slave device directly and forcing a current first block of the single final movie stream to be an I-frame.

6. A method according to claim 1,
   wherein more than one slave device transmits additional images and movie streams to the master device, and
   wherein transmitting is rationed such that no single slave device is allowed to send additional movie streams that occupy the entire final movie stream.

7. A method according to claim 1,
   wherein more than one slave device transmits additional images and movie streams to the master device, and
   wherein transmitting is synchronized to avoid collisions between additional movie streams of different slave devices by blocking transmission on a first-come-first-served basis, or by allowing a user to select which additional movie stream of the different slave devices is to be given priority.

8. A method according to claim 1,
   wherein a user of the master device is notified that additional images and movie streams have been received, and
   wherein the user can decide whether or not to merge the additional images and movie streams into the main movie stream to form the single final movie stream.

9. A method according to claim 1, wherein the additional movie stream captured by the slave device is sent to the master device when the user of the slave device stops recording the additional movie stream captured by the slave device.

10. A method according to claim 1, wherein the additional movie stream captured by the slave device is sent to the master device when a desired length of time has elapsed after beginning the capture of the additional movie stream by the slave device.

11. A method according to claim 10, wherein the desired length of time is up to 5 seconds.

* * * * *